United States Patent
Soni et al.

(10) Patent No.: US 10,467,790 B2
(45) Date of Patent: Nov. 5, 2019

(54) ON-DEMAND IMAGE SPRITING

(71) Applicant: PAYPAL, INC., San Jose, CA (US)

(72) Inventors: Mohit Soni, Rajasthan (IN);
Ramakrishna Vadakattu, Andhra Pradesh (IN)

(73) Assignee: PAYPAL, INC., San Jose, CA (US)

( * ) Notice: Subject to any disclaimer, the term of this patent is extended or adjusted under 35 U.S.C. 154(b) by 115 days.

(21) Appl. No.: 15/641,099

(22) Filed: Jul. 3, 2017

(65) Prior Publication Data

US 2018/0089872 A1 Mar. 29, 2018

Related U.S. Application Data

(63) Continuation of application No. 13/051,811, filed on Mar. 18, 2011, now Pat. No. 9,697,628.

(51) Int. Cl.
| | |
|---|---|
| *G06F 17/00* | (2019.01) |
| *G06T 11/60* | (2006.01) |
| *G06F 17/24* | (2006.01) |

(52) U.S. Cl.
CPC .............. *G06T 11/60* (2013.01); *G06F 17/24* (2013.01)

(58) Field of Classification Search
CPC .............. G06F 17/212; G06F 16/9577; G06F 16/9574; G06F 17/24; G06T 11/60
See application file for complete search history.

(56) References Cited

U.S. PATENT DOCUMENTS

| | | | | |
|---|---|---|---|---|
| 5,001,576 | A * | 3/1991 | Tanaka | H04N 1/40062 358/447 |
| 5,583,869 | A * | 12/1996 | Grube | H04B 7/2643 370/347 |
| 5,699,075 | A * | 12/1997 | Miyamoto | G09G 3/3629 345/94 |
| 5,845,084 | A * | 12/1998 | Cordell | G06Q 30/02 709/234 |
| 6,202,073 | B1 * | 3/2001 | Takahashi | G06T 11/60 345/620 |
| 9,049,271 | B1 * | 6/2015 | Hobbs | H04L 47/25 |
| 2002/0135794 | A1 * | 9/2002 | Rodriguez | H04N 1/00132 358/1.15 |
| 2003/0011821 | A1 * | 1/2003 | Obata | H04N 1/00933 358/1.16 |
| 2004/0194026 | A1 * | 9/2004 | Barrus | G06F 16/93 715/201 |

(Continued)

*Primary Examiner* — Laurie A Ries
(74) *Attorney, Agent, or Firm* — Maschoff Brennan

(57) ABSTRACT

A system receives a page request for a requested document, where the requested document specifies a set of first images as being presentable within the requested document. In response to the received page request, the system modifies the requested document and generates a modified document. The modified document specifies a second image that is to be generated based on the set of first images. The system generates the second image, based on the set of first images, and provides the modified document and access to the second image. The second image is an aggregation of the first images, which are represented within the second image as sprites to be rendered with the modified document. The modified document may use these sprites by specifying regions within the second image as being presentable within the modified document, where these regions correspond to the first images.

20 Claims, 8 Drawing Sheets

(56) References Cited

U.S. PATENT DOCUMENTS

| | | | |
|---|---|---|---|
| 2005/0010610 A1* | 1/2005 | Nishimura | H04N 1/32363 |
| 2007/0038643 A1* | 2/2007 | Epstein | G06F 17/212 |
| 2008/0071877 A1* | 3/2008 | Beach | G06F 16/51 |
| | | | 709/207 |
| 2008/0297811 A1* | 12/2008 | Pierce | H04N 1/00408 |
| | | | 358/1.6 |
| 2009/0217145 A1* | 8/2009 | Watson | G06F 16/9577 |
| | | | 715/202 |
| 2009/0248831 A1* | 10/2009 | Scott | G06T 11/60 |
| | | | 709/217 |
| 2011/0066662 A1* | 3/2011 | Davis | G06F 16/80 |
| | | | 707/811 |
| 2011/0231862 A1* | 9/2011 | Walsh | G06F 13/00 |
| | | | 719/318 |

\* cited by examiner

ON-DEMAND IMAGE SPRITING

CROSS REFERENCED TO RELATED APPLICATIONS

This continuation patent application claims priority to and the benefit of U.S. patent application Ser. No. 13/051,811, filed Mar. 18, 2011, and will issue as U.S. Pat. No. 9,697,628 on Jul. 4, 2017, the contents of which are incorporated by referenced in its entirety.

TECHNICAL FIELD

The subject matter disclosed herein generally relates to the processing of data. Specifically, the present disclosure addresses systems and methods of on-demand image spriting.

BACKGROUND

A document may take the form of an electronic document and may include one or more images (e.g., digital images). An image may be stored as a digital image file that, when rendered (e.g., on a display or a screen), presents visual information to a user. The visual information presented in an image may include graphics, text, or both. Examples of graphics include shapes, designs, patterns, textures, lines, logos, symbols, charts, graphs, photos, or any suitable combination thereof. Examples of text include words, phrases, numerals, punctuation marks, strings of one or more characters, or any suitable combination thereof. The document may include its own text, apart from any text included in an image.

A machine (e.g., a server machine) may facilitate storage, indexing, and retrieval of one or more documents, for example, using a database. A further machine (e.g., a user device) may facilitate generation and transmission of a request for a document, as well as facilitate reception and presentation of the document.

BRIEF DESCRIPTION OF THE DRAWINGS

Some embodiments are illustrated by way of example and not limitation in the figures of the accompanying drawings in which.

DETAILED DESCRIPTION

Figure 1:
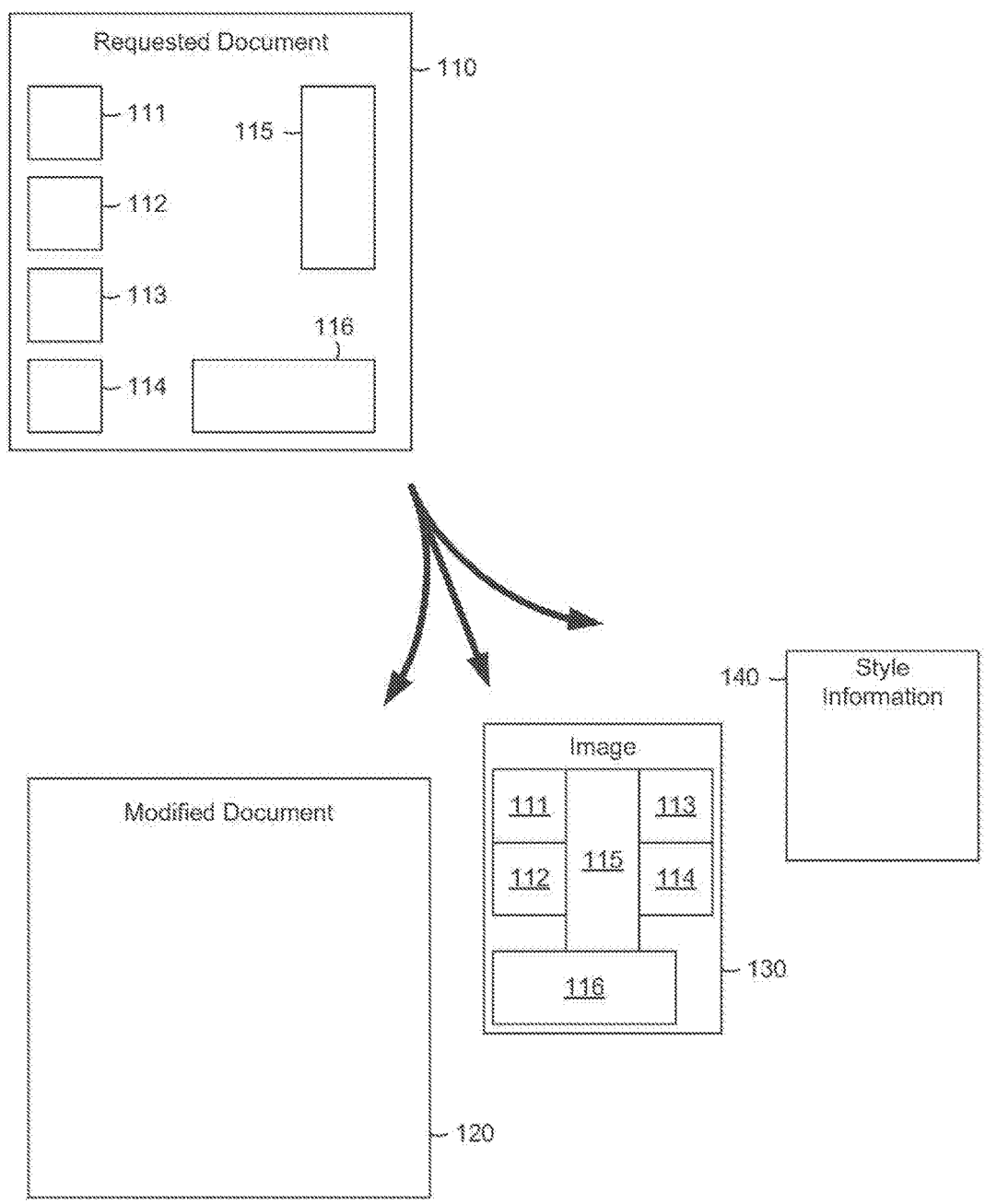
FIG. 1 is a conceptual diagram of a modified document, an aggregation image, and style information being generated based on a requested document, according to some example embodiments.

Example methods and systems are directed to on-demand image spriting. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

On-demand image spriting involves a method that may be implemented in a system (e.g., a computer system programmed to perform the method by special-purpose software stored on a machine-readable medium). The system receives a page request for a requested document (e.g., from a user device), where the requested document specifies a set of first images as being presentable within the requested document. In response to the received page request, the system modifies the requested document and generates a modified document. The modified document specifies a second image that is to be generated based on the set of first images. The system generates the second image, based on the set of first images, and provides the modified document and access to the second image (e.g., to the user device).

In other words, the requested document specifies (e.g., by inclusion or by reference) the set of first images, and the system modifies the requested document to use the second image instead. Accordingly, the modified document specifies the second image (e.g., by inclusion or by reference). The second image may include one or more of the first images or may include data that is renderable to approximate one or more of the first images (e.g., an image altered in size, color, or compression). Hence, the second image may be thought of as an aggregation image generated from the set of first images, which are represented within the second image as sprites to be rendered with the modified document. The modified document may use these sprites in a manner analogous to the use of the first images by the requested document. Specifically, the modified document may specify a set of regions within the second image as being presentable within the modified document, where these regions correspond to the first images.

The generation of the modified document, the second image, or both, may be performed in response to the received page request for the requested document. Accordingly, this generation of the modified document and its second image from the requested document and its set of first images, in response to the page request, may be thought of as on-demand image spriting. In generating the second image, the system may access the set of first images from an image database, and this accessing may be based on (e.g., according to) the requested document.

As generated by the system, the modified document may be configured to cause a browser (e.g., executing at a user device) to communicate an image request for the second image to the system. In response, the system may receive the image request and provide the second image to the browser. In some example embodiments, the generating of the second image is in response to the received image request.

Style information (e.g., a cascading style sheet (CSS)) may be used to specify presentational characteristics of the sprites in the aggregation image (e.g., second image). As generated by the system, the modified document may be configured to cause the browser (e.g., executing at the user device) to communicate a style request for the style information to the system. In response, the system may receive the style request and provide the style information to the browser. In some example embodiments, the system may generate the style information, for example, along with generating the second image.

According to certain example embodiments, the set of first images may be subdivided into one or more portions. On-demand image spriting may be performed separately for these portions, resulting in multiple aggregation images (e.g., a second image and a third image) that may be provided to the browser at different priorities, times, data rates, or any suitable combination thereof. In other words, an aggregation image (e.g., second image) may be downloaded at a high priority, immediately upon request, at a high data rate, or any suitable combination thereof, while another aggregation image (e.g., third image) may be downloaded at a lower priority, after a time delay, at a reduced data rate, or any suitable combination thereof. This technique may be thought of as a form of "lazy loading," where, for example, those first images that are positioned near the top of the requested document may be sent as sprites in a fast-loading aggregation image (e.g., the second image), while those first images that are positioned away from the top of the requested document may be sent as sprites in a slow-loading aggregation image (e.g., the third image). This lazy loading technique may be applied to any number of aggregation images (e.g., a fourth image, a fifth image, etc.).

On-demand image spriting may have the effect of reducing the number of requests (e.g., hypertext transfer protocol (HTTP) requests) involved in downloading images specified by a document (e.g., a webpage). As a result, the document may be loaded more quickly into a browser (e.g., executing at a user device), and network performance may be improved due at least in part to the reduction in requests.

FIG. 1 is a conceptual diagram of a modified document 120, an aggregation image 130, and style information 140 being generated based on a requested document 110, according to some example embodiments. As shown, the requested document 110 includes several first images 111-116. The first images 111-116 are specified by the requested document 110 (e.g., by inclusion). In some example embodiments, the requested document 110 specifies the first images 111-116 by reference (e.g., by network address or uniform resource locator (URL)). In other words, the requested document 110 may include one or more references to one or more of the first images 111-116, instead of including the actual first images 111-116 themselves. Additional information (e.g., graphics, text, or both) may be included in the requested document 110. As indicated by the three arrows in FIG. 1, the requested document 110 may be modified to generate the modified document 120, the aggregation image 130, and the style information 140.

The modified document 120 is a version of the requested document 110. The modified document 120, however, does not specify the first images 111-116, but rather specifies the aggregation image 130 (e.g., second image). In other words, the first images 111-116 may be absent from the modified document 120. The modified document 120 may specify the aggregation image 130 by inclusion or by reference. Similarly, the modified document 120 may specify the style information 140 by inclusion or by reference. In some example embodiments, the modified document 120 specifies one or more regions within the aggregation image 130 as being presentable within the modified document 120. Any additional information (e.g., graphics, text, or both) included in the requested document 110, though, may be similarly included in the modified document 120. According to certain example embodiments, the modified document 120 is configured to cause a browser to communicate an image request for the aggregation image 130. Similarly, in various example embodiments, the modified document 120 is configured to cause the browser to communicate a style request for the style information 140.

The aggregation image 130 (e.g., second image) is generated from the first images 111-116 and, as shown, includes the first images 111-116 as regions within the aggregation image 130. As shown, the first images 111-116, as regions within the aggregation image 130, may be arranged differently within the aggregation image 130 compared to their original layout within the requested document 110. The aggregation image 130 may contain additional data beyond the first images 111-116, and in some example embodiments, may incorporate the style information 140.

The style information 140 correlates (e.g., maps or indexes) the first images 111-116 with one or more regions within the aggregation image 130. In some example embodiments, the style information 140 is a CSS or other document that indicates which region within the aggregation image 130 corresponds to each of the first images 111-116.

Figure 2:
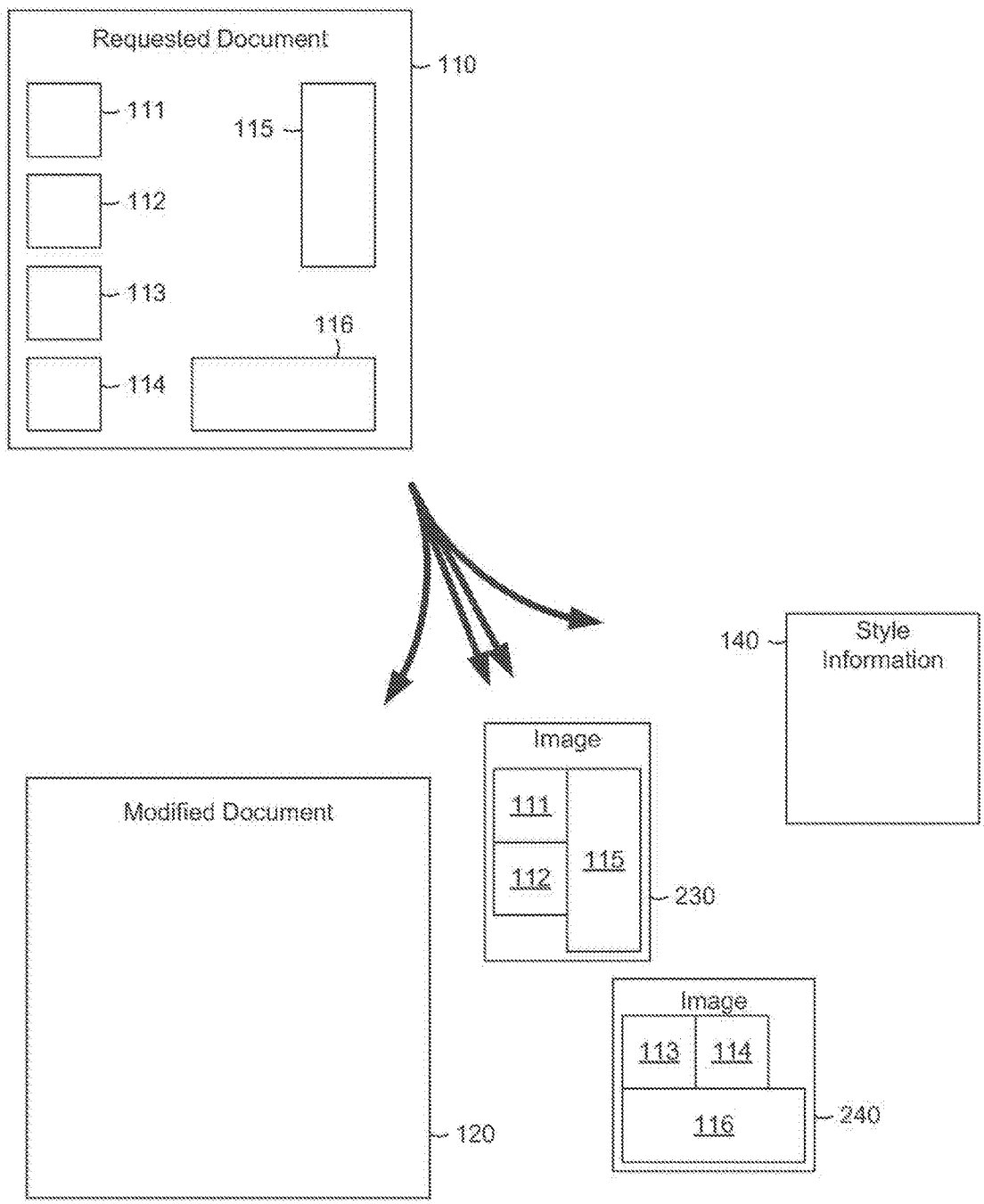
FIG. 2 is a conceptual diagram of a modified document, multiple aggregation images, and style information being generated based on a requested document, according to some example embodiments.

FIG. 2 is a conceptual diagram of the modified document 120, aggregation images 230 and 240, and the style information 140 being generated based on the requested document 110, according to some example embodiments. As noted above, the requested document 110 includes the first images 111-116, which are specified by the requested document 110 (e.g., by inclusion or by reference). As indicated by the four arrows in FIG. 2, the requested document 110 may be modified to generate the aggregation images 230 and 240, along with the modified document 120 and the style information 140. In the example embodiments illustrated by FIG. 2, the first images 111-116 are subdivided into two portions, each portion corresponding to one of the aggregation images 230 and 240. One portion includes first images 111, 112, and 115, while the other portion includes first images 113, 114, and 116.

The aggregation image 230 (e.g., second image) is generated from one portion, specifically, first images 111, 112, and 115, which are included as regions within the aggregation image 230. Similarly, the aggregation image 240 (e.g., third image) is generated from the other portion, namely, first images 113, 114, and 116, which are included as regions within the aggregation image 240. As shown, the arrangement of the first images 111-116 in their respective aggregation images 230 and 240 may be different from their original arrangement within the requested document 110. Either or both of the aggregation images 230 and 240 may contain additional data, including some or all of the style information 140.

As shown in FIG. 2, the style information 140 correlates the first images 111-116 with one or more regions within the aggregation images 230 and 240. In certain example embodiments, the style information 140 is a CSS or other document that indicates which region within the aggregation image 230 corresponds to each of the first images 111, 112, and 115, and which region within the aggregation image 240 corresponds to each of the first images 113, 114, and 116.

As noted above, the modified document 120 may specify one or more of the aggregation images 230 and 240 by inclusion or by reference, and may specify the style information 140 by inclusion or by reference. The modified document 120 may specify one or more regions within either or both of the aggregation images 230 and 240 as being presentable within the modified document 120. Other characteristics of the modified document 120 are described above with respect to FIG. 1.

Figure 3:
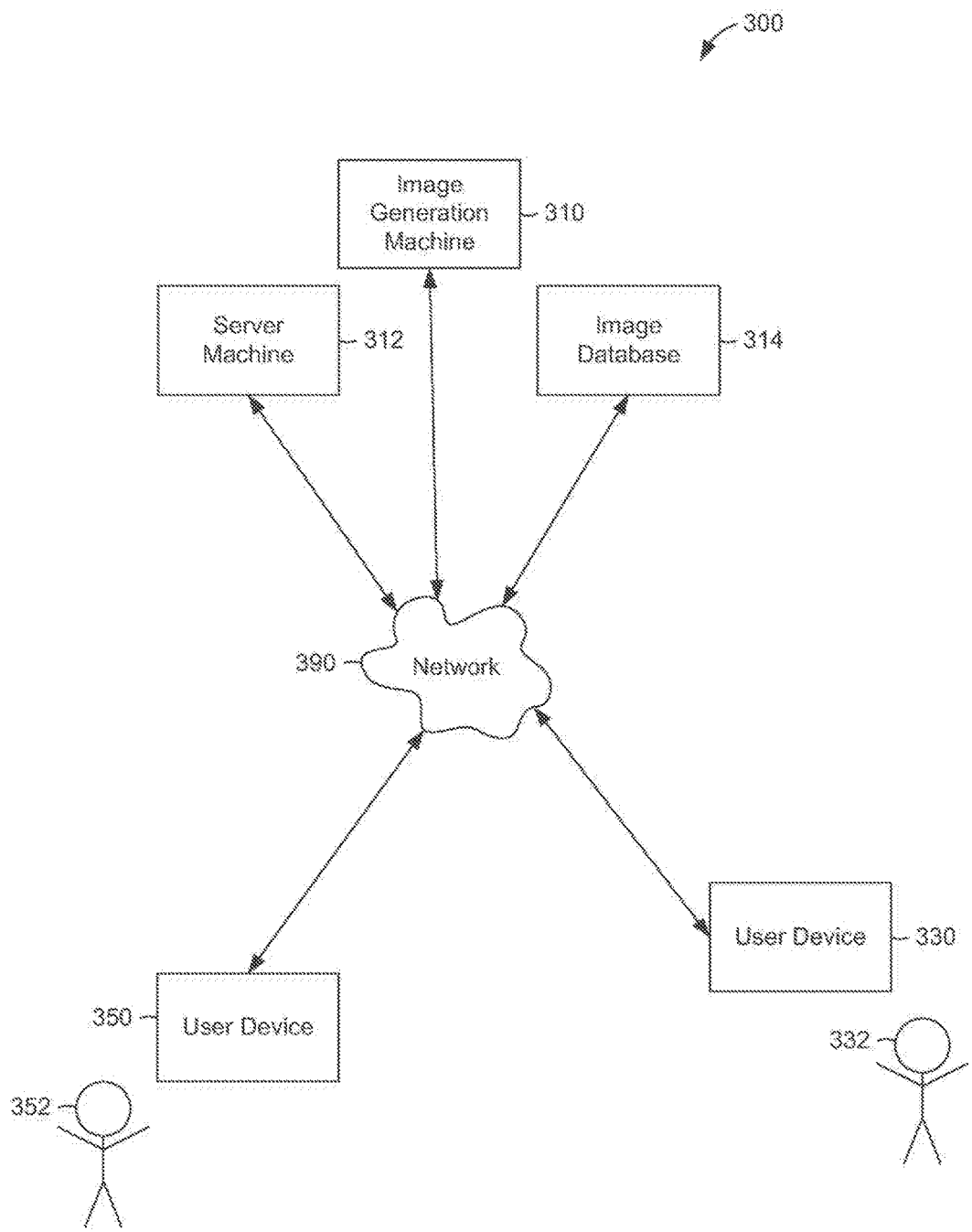
FIG. 3 is a network diagram illustrating a network environment suitable for on-demand image spriting, according to some example embodiments.

FIG. 3 is a network diagram illustrating a network environment 300 suitable for on-demand image spriting, according to some example embodiments. The network environment 300 includes an image generation machine 310, a server machine 312, an image database 314, and user devices 330 and 350, all communicatively coupled to each other via a network 390.

The image generation machine 310 may perform on-demand image spriting according to one or more the methodologies described herein. As shown in FIG. 3, the image generation machine 310 may communicate with multiple user devices 330 and 350. In some example embodiments, the image generation machine 310 receives a page request via the network 390 from the user device 330 and provides the modified document 120 to the user device 330 in response to the page request. In certain example embodiments, the server machine 312 functions as an intermediary that receives the page request from the user device 330 and communicates the page request to the image generation machine 310, which provides the modified document 120 to the server machine 312 for subsequent communication to the user device 330. According to various example embodiments, the server machine 312 and the image generation machine 310 function together as a single unit (e.g., a server with image generation capabilities).

The image database 314 is configured to store one or more images (e.g., first images 111-116). In support of on-demand image spriting, the image database 314 is accessible by the image generation machine 310, by the server machine 312, or by both.

In some example embodiments, the image generation machine 310 is located (e.g., physically, architecturally, logically, or any suitable combination thereof) close to the server machine 312, to the image database 314, or to both, so that communication (e.g., via all or part of the network 390) among one or more of them may be performed at a high data rate, with low latency, or any suitable combination thereof, in comparison to communication involving the user devices 330 and 350. This may result in enhancing the performance and benefits of on-demand image spriting.

Also shown in FIG. 3 are users 332 and 352. One or both of the users 332 and 352 may be a human user (e.g., a human being), a machine user (e.g., software program to interact with a client device), or any suitable combination thereof. The user 332 is not part of the network environment 300, but is associated with the user device 330 and may be a user of the user device 330. For example, the user device 330 may be a deskside computer, tablet computer, or smart phone belonging to the user 332. Similarly, the user 352 is not part of the network environment 300, but is associated with the user device 350. As an example, the user device 350 may be a laptop computer belonging to the user 352.

Any of the machines, databases, or devices shown in FIG. 3 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 8. As used herein, a "database" is a data storage resource and may store data structured as a text file, a table, a spreadsheet, a relational database, a triple store, or any suitable combination thereof. Moreover, any two or more of the machines illustrated in FIG. 3 may be combined into a single machine, and the functions described herein for any single machine may be subdivided among multiple machines.

The network 390 may be any network that enables communication between machines (e.g., image generation machine 310 and user device 330). Accordingly, the network 390 may be a wired network, a wireless network, or any suitable combination thereof. The network 390 may include one or more portions that constitute a private network, a public network (e.g., the Internet), or any suitable combination thereof.

Figure 4:
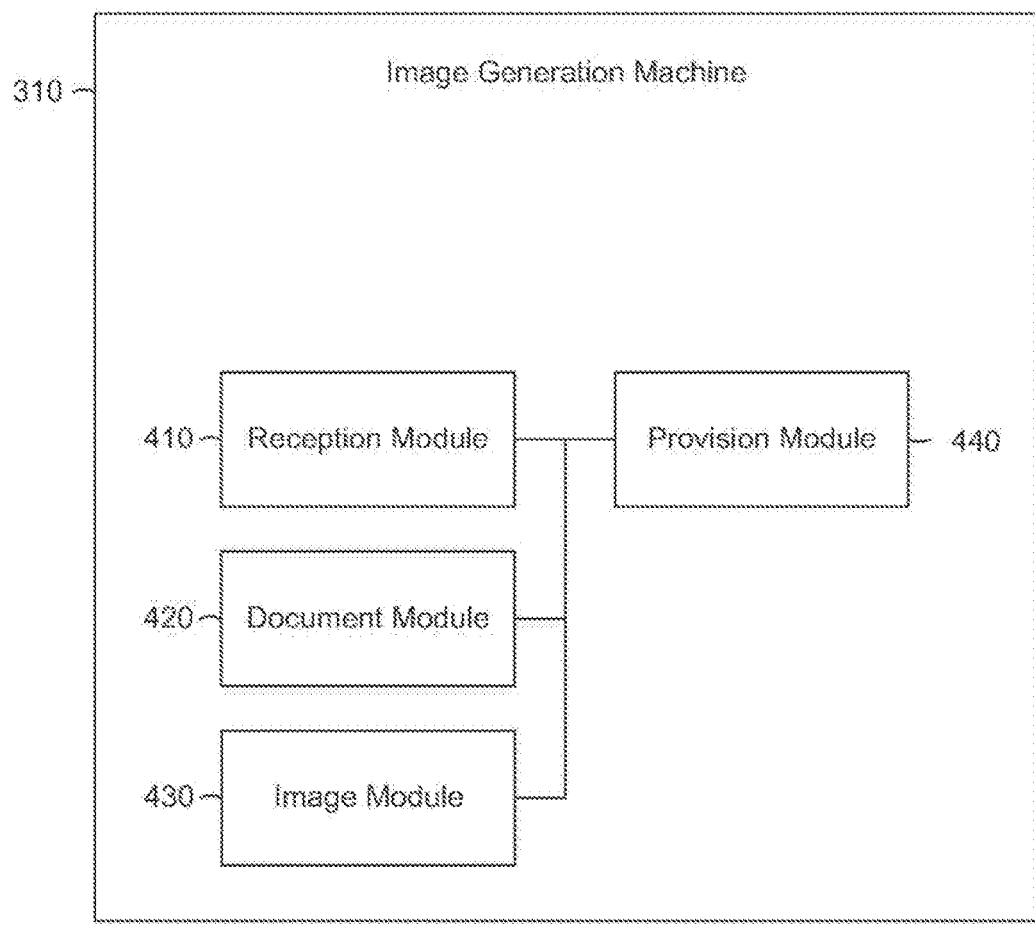
FIG. 4 is a block diagram illustrating components of an image generation machine, according to some example embodiments.

FIG. 4 is a block diagram illustrating components of the image generation machine 310, according to some example embodiments. The image generation machine 310 includes a reception module 410, a document module 420, an image module 430, and a provision module 440, all configured to communicate with each other (e.g., via a bus, a shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The reception module 410 is configured to receive a page request for the requested document 110. The page request may be received from the user device (e.g., user device 330), the server machine 312, or any suitable combination thereof. The requested document 110 specifies a set of first images 111-116 as being presentable within the requested document 110.

The document module 420 is configured to generate the modified document 120 by modifying the requested document 110 in response to the receiving of the page request by the reception module 410. For example, the document module 420 may replace references to one or more of the first images 111-116 with one or more references to a second image (e.g., aggregation image 130 or aggregation image 230) or one or more regions thereof. Accordingly, the modified document 120 may specify at least the second image, which is to be generated based on the set of first images 111-116.

The image module 430 is configured to generate at least the second image (e.g., aggregation image 130 or aggregation image 230) from the set of first images 111-116. Generation of the second image may be based on a portion of the first images 111-116, in certain example embodiments. According to various example embodiments, the image module 430 is further configured to generate a third image (e.g., aggregation image 240) from the set of first images 111-116 (e.g., a portion thereof). Additional functions of the various modules within the image generation machine 310 are described below with respect to FIG. 5-7.

The provision module 440 is configured to provide the modified document 120 and to provide access to the second image (e.g., aggregation image 130 or aggregation image 230). For example, the modified document 120 and the access to the second image may be provided by the provision module 440 as all or part of a response to a page request (e.g., received by the reception module 410). In some example embodiments, the provision module 440 is configured to provide one or more images (e.g., aggregation image 130, aggregation image 230, or aggregation image 240). The one or more images may be provided to a user device (e.g., user device 330). In certain example embodiments, the provision module 440 is configured to provide the style information 140 to a user device.

Figure 5:
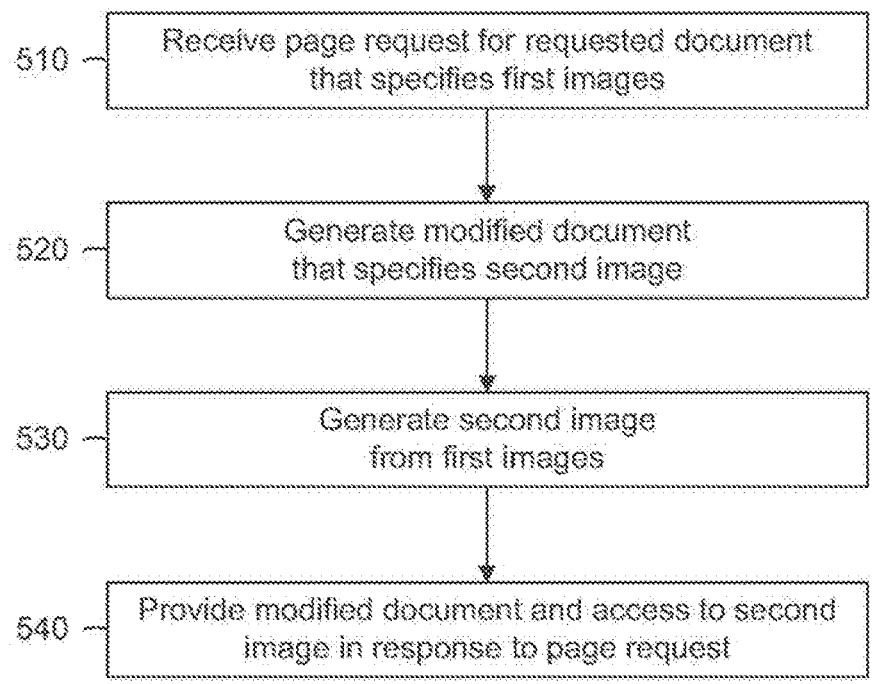
FIG. 5-7 are flowcharts illustrating operations in a method of on-demand image spriting, according to some example embodiments.
Figure 6:
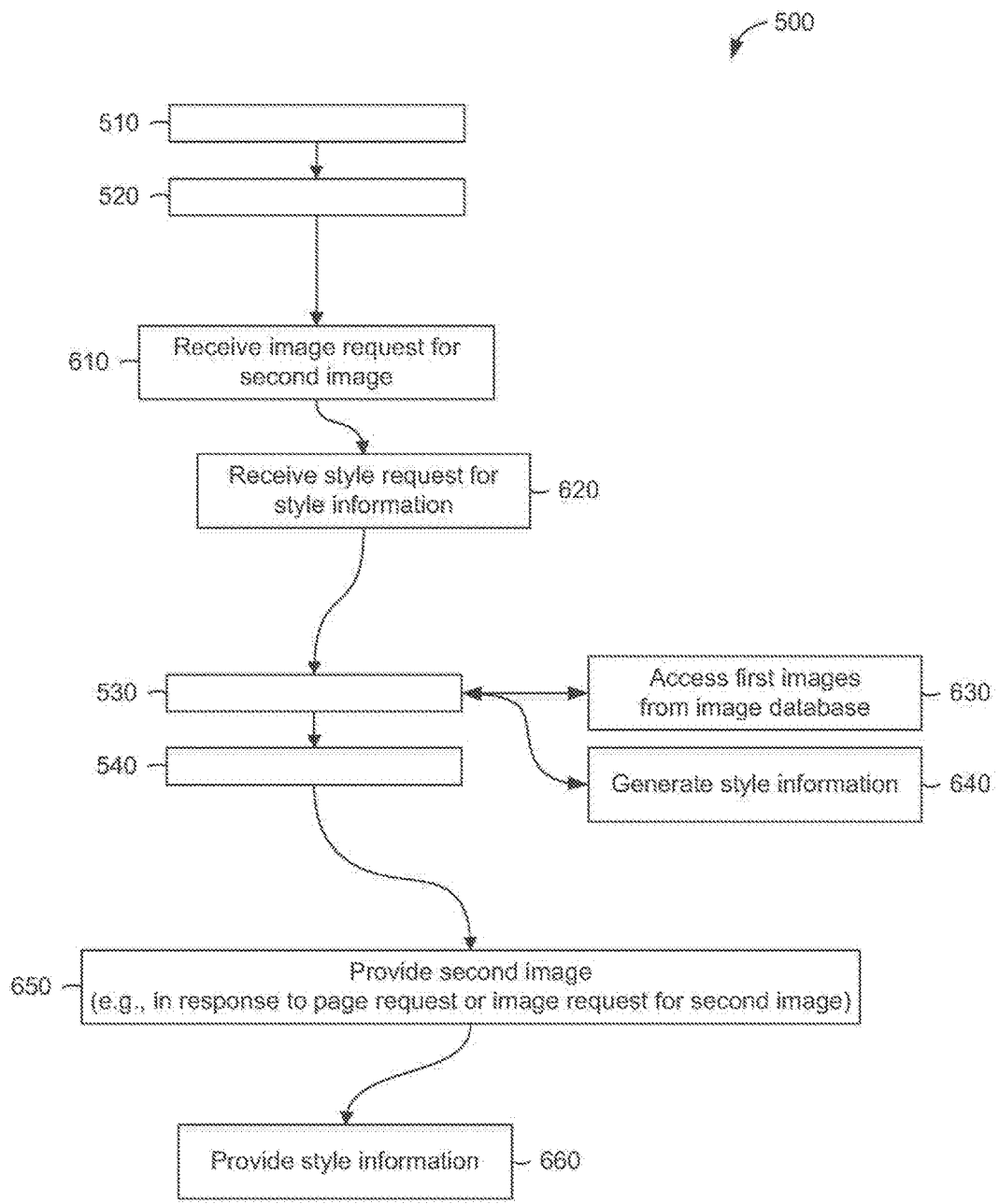
Figure 7:
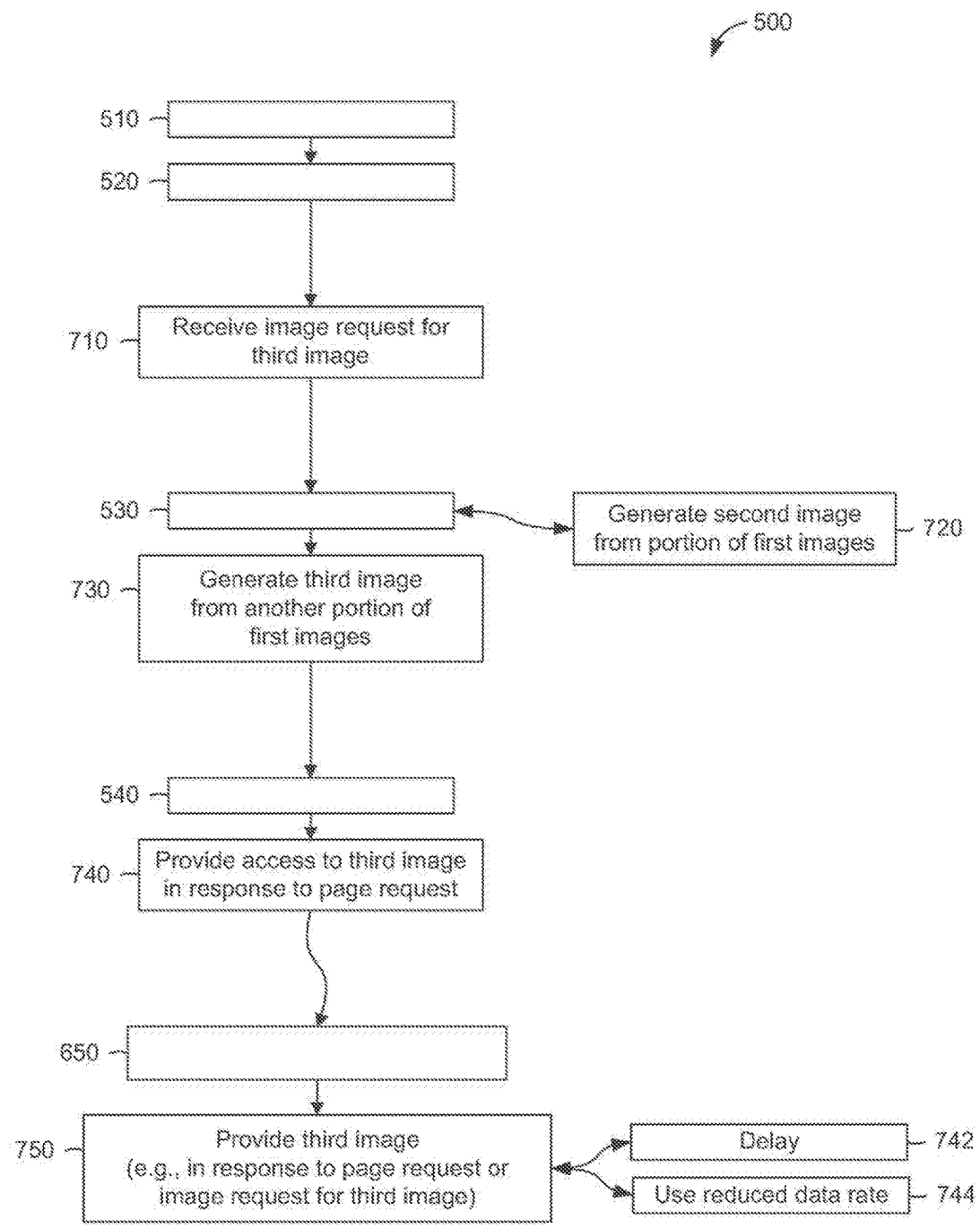

FIG. 5-7 are flowcharts illustrating operations in a method 500 of on-demand image spriting, according to some example embodiments. Operations in a method 500 may be performed by the image generation machine 310, for example, using modules described above with respect to FIG. 4.

As shown in FIG. 5, some example embodiments of the method 500 include operations 510-540. In operation 510, the reception module 410 of the image generation machine 310 receives a page request for the requested document 110. As noted above, the requested document 110 specifies a set of first images 111-116 as being presentable within the requested document 110. The page request may include a URL of the requested document 110. The image generation machine 310 may perform one or more of operations 520, 530, and 540 in response to the received page request.

In operation 520, the document module 420 of the image generation machine 310 generates the modified document 120 by modifying the requested document 110. Modification of the requested document 110 may include replacing references to one or more of the first images 111-116 with one or more references to a second image (e.g., aggregation image 130 or aggregation image 230) or one or more regions thereof. As noted above, the modified document 120 may specify at least the second image. In some example embodiments, the requested document 110 includes the first images 111-116, and modification of the requested document 110 includes replacing the first images 111-116 with references to distinct regions of the second image.

In operation 530, the image module 430 of the image generation machine 310 generates the second image (e.g., aggregation image 130 or aggregation image 230) based on (e.g., from) the set of first images 111-116. The second image may be generated as including one or more of the first images 111-116. In some example embodiments, the one or more of the first images 111-116 are arranged differently within the generated second image compared to their original positions within the requested document 110.

In operation 540, the provision module 440 of the image generation machine 310 provides the modified document 120 and provides access to the second image (e.g., aggregation image 130 or aggregation image 230) to the user device 330, to the server machine 312, or any suitable combination thereof. Provision of the modified document 120, the access to the second image, or both, may form all or part of a response to the page request received in operation 510.

As shown in FIG. 6, certain example embodiments of the method 500 include operations 610-660. As shown, operation 610 and 620 may be performed after operation 520. One or both of operations 610 and 620, however, may be performed after operation 540, in various example embodiments.

In operation 610, the reception module 410 of the image generation machine 310 receives an image request for the second image (e.g., aggregation image 130 or aggregation image 230). The image request may be received as a result of the modified document 120 being configured to cause a browser (e.g., executing at the user device 330) to communicate the image request. The image request may be received from a user device (e.g., user device 330).

In operation 620, the reception module 410 of the image generation machine 310 receives a style request for the style information 140. The style request may be received as a result of the modified document 120 being configured to cause the browser (e.g., executing at the user device 330) to communicate the style request. The style request may be received from a user device (e.g., user device 330).

As shown, operation 630, operation 640, or both, may be included in operation 530 (e.g., executed as part of operation 530). According to certain example embodiments, one or both of operation 630 and 640 may be executed prior to operation 530 (e.g., as prerequisite tasks).

In operation 630, the image module 430 of the image generation machine 310 accesses the set of first images 111-116 from the image database 314. For example, the requested document 110 may specify the set of first images 111-116 by including references (e.g., addresses, pointers, or URLs) to the first images 111-116 as stored in the image database 314. The image module 430, in executing operation 630, may use the references to read or retrieve the first images 111-116, thus accessing the first images 111-116 based on the requested document 110. In some example embodiments, the image module 430 may also store the generated second image in the image database 314.

In operation 640, the document module 420 of the image generation machine 310 generates the style information 140. Generation of the style information 140 may be based on the requested document 110, on the second image (e.g., aggregation image 130 or aggregation image 230) generated by the image module 430, or on both. For example, document module 420 may identify the positions of one or more of the first images 111-116 as arranged within the requested document 110 and map those positions to one or more regions of the second image, as generated by the image module 430. As another example, the document module 420 may map the positions prior to generation of the second image by the image module 430 (e.g., with the image module 430 using the generated style information 140 as a guide for generating the second image).

In operation 650, the provision module 440 of the image generation machine 310 provides the second image (e.g., aggregation image 130 or aggregation image 230). This may be in response to the page request received in operation 510, to the image request received in operation 610, or both. In some example embodiments, the page request, the image request, or both, are received from the user device 330, and the provision module 440 provides the second image to the user device 330 in response. According to certain example embodiments, the page request, the image request, or both, are received from the server machine 312 (e.g., acting as an intermediary between the image generation machine 310 and the user device 330), and the second image is provided to the server machine 312 (e.g., for subsequent communication to the user device 330). In some example embodiments, the provision module 440 may provide the second image from the image database 314.

In operation 660, the provision module 440 of the image generation machine 310 provides the style information 140. This may be in response to the page request received in operation 510, to the style request received in operation 620, or both. In some example embodiments, the page request, the style request, or both are received from the user device 330, and the provision module 440 provides the style information 140 to the user device 330. According to certain example embodiments, the page request, the style request, or both, are received from the server machine 312, and the style information 140 is provided by the provision module 440 to the server machine 312.

As shown in FIG. 7, some example embodiments of the method 500 include operations 710-750. With operations 710-750, the method 500 may implement "lazy loading" of one or more aggregation images (e.g., aggregation image 240).

In operation 710, the reception module 410 of the image generation machine 310 receives an image request for a third image (e.g., aggregation image 240). This image request for the third image may be thought of as a further image request that is distinct from the image request for the second image (e.g., aggregation image 230) received in operation 610. This further image request for the third image may be received as a result of the modified document 120 being configured to cause the browser (e.g., executing at the user device 330) to communicate the further image request.

Operation 720 may be included in operation 530 and may be performed by the image module 430 of the image generation machine 310. In operation 720, the generating of the second image (e.g., aggregation image 230) is limited to using a portion of the set of first images 111-116. In other words, the combination of operations 530 and 720 generates the second image from a portion of the first images 111-116 (e.g., first images 111, 112, and 115), resulting in the second image being an aggregation of that portion.

In operation 730, the image module 430 of the image generation machine 310 generates the third image (e.g., aggregation image 240) based on (e.g., from) another portion of the set of first images 111-116 (e.g., first images 113, 114, and 116) that is distinct from the portion of the first images 111-116 used to create the second image. As a result, the third image is an aggregation of that other portion. In other words, the generating of the third image may be limited to using a further portion of the first set of images 111-116, where the further portion is not the same portion used in operation 720. In some example embodiments, the image module 430 may store the generated third image in the image database 314.

In operation 740, the provision module 440 of the image generation machine 310 provides access to the third image (e.g., aggregation image 240). Provision of the access to the third image, may form part of the response to the page request received in operation 510.

In operation 750, the provision module 440 of the image generation machine 310 provides the third image (e.g., aggregation image 240). This may be in response to the page request received in operation 510, to the further image request received in operation 710, or both. In certain example embodiments, the page request, the further image request, or both, are received from the user device 330, and the provision module 440 provides the third image to the user device 330. According to some example embodiments, the page request, the further image request, or both, are received from the server machine 312 (e.g., acting as an intermediary between the image generation machine and the user device 330), and the third image is provided to the server machine 312 (e.g., for subsequent communication to the user device 330). In certain example embodiments, the provision module 440 may provide the third image from the image database 314.

According to various example embodiments, operation 750 may include operations 742, operation 744, or both. In some example embodiments, one or both of operations 742 and 744 are implemented as part of operation 740.

In operation 742, the provision module 440 of the image generation machine 310 delays the providing of the third image, the providing of the access to the third image, or both. This may have the effect of implementing "lazy loading" for the third image. For example, the provision module 440 may delay the providing of the third image, the providing of the access to the third image, or both, based on a time period. The time period may be predetermined (e.g., a default value), specified in the requested document 110, specified in the modified document 120, or any suitable combination thereof. As another example, the provision module 440 may delay based on an event (e.g., an indication of an event being received by the reception module 410). Examples of an event include a user input (e.g. mouseover or click), a completion of a data download (e.g., an advertisement, a widget, or a script), a change in network traffic or capacity (e.g., available to the user device 330), and generation of the third image (e.g., in operation 730). According to some example embodiments, the delaying of the providing of the third image, the providing of the access to the third image, or both, is performed by a client (e.g., user device 330) of the image generation machine 330. For example, based on a time period, an event, or both, a browser executing on the user device 330 may initiate a request to receive the third image, the access to the third image, or both.

In operation 744, the provision module 440 of the image generation machine 310 uses (e.g., selects) a reduced data rate for the providing of the third image, the providing of the access to the third image, or both. This reduced data rate is reduced relative to another data rate (e.g., a nominal, default, or maximum rate) used by the provision module 440 for the second image (e.g., aggregation image 230). This may have the effect of causing the third image to load slower than the second image within a browser (e.g., executing on the user device 330).

According to various example embodiments, one or more of the methodologies described herein may facilitate on-demand image spriting. In particular, one or more of the methodologies described herein may constitute all or part of a business method (e.g., a business method implemented using a machine) that provides improvements in document loading time, image loading time, or both, to one or more users of a network-based system (e.g., a network-based publication system or a network-based commerce system). Accordingly, one or more the methodologies described herein may have the effect of increasing user attention (e.g., as measured in page views or clickthroughs) on one or more documents, increasing sales of products described by the one or more documents, or both.

When these effects are considered in aggregate, one or more of the methodologies described herein may obviate a need for certain efforts or resources that otherwise would be involved in assisting users who are searching for information likely to be of interest. Efforts expended by a user in identifying such information may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Figure 8:
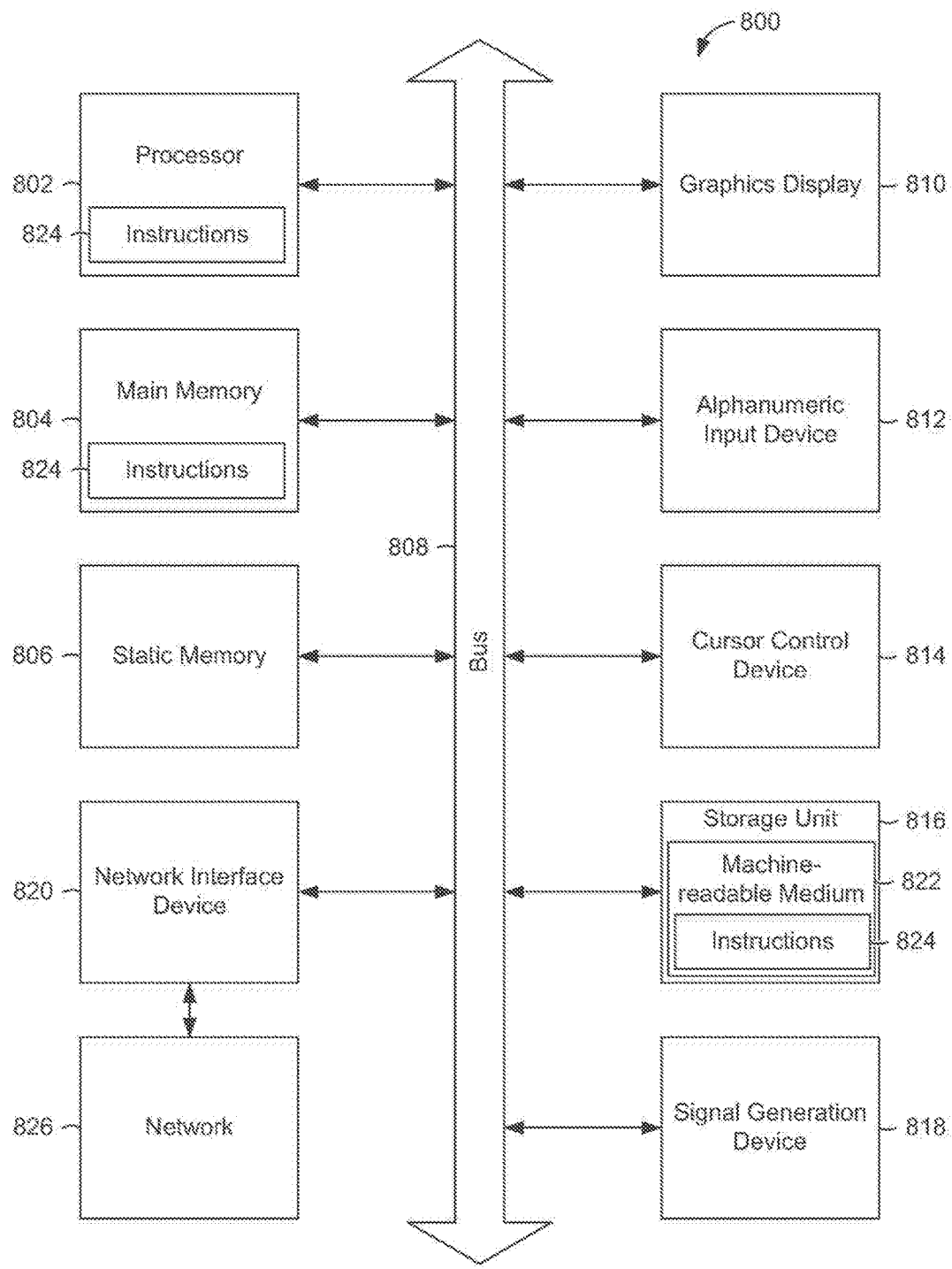
FIG. 8 is a block diagram illustrating components of a machine, according to some example embodiments, able to read instructions from a machine-readable medium and perform any one or more of the methodologies discussed herein.

FIG. 8 illustrates components of a machine 800, according to some example embodiments, that is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 (e.g., network 390) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., software) for execution by the machine, such that the instructions, when executed by one or more processors of the machine (e.g., processor 802), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
   at least one processor; and
   at least one memory device storing computer-executable instructions that, in response to execution by the at least one processor, cause the system to perform operations comprising:
   receiving a request for an electronic document to be displayed on a user device;
   identifying a plurality of images included in the electronic document;
   identifying a high-priority subset of the plurality of images based on a priority criteria;
   generating a first aggregated image that includes the high-priority subset of the plurality of images;
   generating a second aggregated image that includes one or more members of the plurality of images other than the high-priority subset;
   generating a modified electronic document comprising the first aggregated image, the second generated aggregated image, and style information, wherein the style information includes a respective location on the electronic document for each image of the high-priority subset of the plurality of images and a respective location on the electronic document for each image of the one or more members of the plurality of images other than the high-priority subset; and
   transmitting the modified electronic document to the user device, wherein the transmitted modified electronic document is usable by the user device to display the electronic document by extracting and placing members of the plurality of images from the first aggregated image and the second aggregated image in accordance with the style information.

2. The system of claim 1, wherein at least one of the high-priority subset of the plurality of images is located in a region on the electronic document that does not correspond to a region of the modified document where the first aggregated image is located.

3. The system of claim 1, wherein the style information comprises a cascading style sheet correlating:
   the high-priority subset of the plurality of images with the first aggregated image;
   the respective location on the electronic document for each image of the high-priority subset of the plurality of images;

the one or more members of the plurality of images other than the high-priority subset with the second aggregated image; and the respective location on the electronic document for each image of the one or more members of the plurality of images other than the high-priority subset.

4. The system of claim 1, wherein the priority criteria corresponds to bandwidth required to transmit an image.

5. The system of claim 1, wherein the transmitting the modified electronic document includes transmitting the first aggregated image prior to transmitting the second aggregated image, such that the user device is able to begin rendering the high-priority subset of the plurality of images prior to receiving the second aggregated image.

6. The system of claim 1, wherein the modified electronic document further includes a third aggregated image that includes one or more additional members of the plurality of images, the one or more additional members of the plurality of images being of lower priority criteria than the one or more members of the plurality of images in the second aggregated image.

7. The system of claim 6, wherein the style information comprises a cascading style sheet correlating:
the one or more additional members of the plurality of images with the third aggregated image; and
a respective location on the electronic document for each of the one or more additional members of the plurality of images.

8. A method, comprising:
receiving, at a computing device, a request for an electronic document to be displayed on a user device;
identifying, by the computing device, a plurality of images included in the electronic document;
identifying, by the computing device, a high-priority subset of the plurality of images based on a priority criteria;
generating, by the computing device, a first aggregated image that includes the high-priority subset of the plurality of images;
generating, by the computing device, a second aggregated image that includes one or more members of the plurality of images other than the high-priority subset;
generating, by the computing device, a modified electronic document comprising the first aggregated image, the second generated aggregated image, and style information, wherein the style information includes a respective location on the electronic document for each image of the high-priority subset of the plurality of images and a respective location on the electronic document for each image of the one or more members of the plurality of images other than the high-priority subset; and
transmitting, by the computing device, the modified electronic document to the user device, wherein the transmitted modified electronic document is usable by the user device to display the electronic document by extracting and placing members of the plurality of images from the first aggregated image and the second aggregated image in accordance with the style information.

9. The method of claim 8, wherein at least one of the high-priority subset of the plurality of images is located in a region on the electronic document that does not correspond to a region of the modified document where the first aggregated image is located.

10. The method of claim 8, wherein the style information comprises a cascading style sheet correlating:
the high-priority subset of the plurality of images with the first aggregated image;
the respective location on the electronic document for each image of the high-priority subset of the plurality of images;
the one or more members of the plurality of images other than the high-priority subset with the second aggregated image; and
the respective location on the electronic document for each image of the one or more members of the plurality of images other than the high-priority subset.

11. The method of claim 8, wherein the priority criteria corresponds to bandwidth required to transmit an image.

12. The method of claim 8, wherein the transmitting the modified electronic document includes transmitting the first aggregated image prior to transmitting the second aggregated image, such that the user device is able to begin rendering the high-priority subset of the plurality of images prior to receiving the second aggregated image.

13. The method of claim 8, wherein the modified electronic document further includes a third aggregated image that includes one or more additional members of the plurality of images, the one or more additional members of the plurality of images having lower priority criteria than the one or more members of the plurality of images in the second aggregated image.

14. The method of claim 13, wherein the style information comprises a cascading style sheet correlating:
the one or more additional members of the plurality of images with the third aggregated image; and
a respective location on the electronic document for each of the one or more additional members of the plurality of images.

15. A non-transitory machine-readable medium comprising instructions which, in response to execution by a computer system, cause the computer system to perform operations comprising:
receiving a request for an electronic document to be displayed on a user device;
identifying a plurality of images included in the electronic document;
identifying a high-priority subset of the plurality of images based on a priority criteria;
generating a first aggregated image that includes the high-priority subset of the plurality of images;
generating a second aggregated image that includes one or more members of the plurality of images other than the high-priority subset;
generating a modified electronic document comprising the first aggregated image, the second generated aggregated image, and style information, wherein the style information includes a respective location on the electronic document for each image of the high-priority subset of the plurality of images and a respective location on the electronic document for each image of the one or more members of the plurality of images other than the high-priority subset; and
transmitting the modified electronic document to the user device, wherein the transmitted modified electronic document is usable by the user device to display the electronic document by extracting and placing members of the plurality of images from the first aggregated image and the second aggregated image in accordance with the style information.

16. The non-transitory machine-readable medium of claim 15, wherein at least one of the high-priority subset of the plurality of images is located in a region on the electronic document that does not correspond to a region of the modified document where the first aggregated image is located.

17. The non-transitory machine-readable medium of claim 15, wherein the style information comprises a cascading style sheet correlating:
- the high-priority subset of the plurality of images with the first aggregated image;
- the respective location on the electronic document for each image of the high-priority subset of the plurality of images;
- the one or more members of the plurality of images other than the high-priority subset with the second aggregated image; and
- the respective location on the electronic document for each image of the one or more members of the plurality of images other than the high-priority subset.

18. The non-transitory machine-readable medium of claim 15, wherein the priority criteria corresponds to bandwidth required to transmit an image.

19. The non-transitory machine-readable medium of claim 15, wherein the transmitting the modified electronic document includes transmitting the first aggregated image prior to transmitting the second aggregated image, such that the user device is able to begin rendering the high-priority subset of the plurality of images prior to receiving the second aggregated image.

20. The non-transitory machine-readable medium of claim 15, wherein the modified electronic document further includes a third aggregated image that includes one or more additional members of the plurality of images, the one or more additional members of the plurality of images being of lower priority criteria than the one or more members of the plurality of images in the second aggregated image.

* * * * *